United States Patent [19]

Hobrough

[11] Patent Number: 4,586,153
[45] Date of Patent: Apr. 29, 1986

[54] SERIAL CROSS-CORRELATORS

[76] Inventor: Gilbert L. Hobrough, Westbury, 5 Station Road, Bentley, Farnham, Hampshire, England

[21] Appl. No.: 535,268

[22] Filed: Sep. 23, 1983

[30] Foreign Application Priority Data

Sep. 28, 1982 [GB] United Kingdom ................. 8227609

[51] Int. Cl.⁴ .................... G06F 15/336; G06J 1/00; G06G 7/19
[52] U.S. Cl. .................................... 364/728; 364/604; 364/724; 364/819; 324/77 G
[58] Field of Search ............... 364/800, 807, 819, 820, 364/824, 841, 715, 724–725, 728, 604; 324/77 E, 77 G; 333/18

[56] References Cited

U.S. PATENT DOCUMENTS

| | | | |
|---|---|---|---|
| 3,197,625 | 7/1965 | Ratz | 364/819 X |
| 3,961,172 | 6/1976 | Hutcheon | 364/819 X |
| 4,089,061 | 5/1978 | Milewski | 364/724 |
| 4,283,767 | 8/1981 | Rountree | 364/728 X |
| 4,388,595 | 6/1983 | Brooks | 364/819 X |
| 4,433,422 | 2/1984 | Kurth | 364/728 X |

OTHER PUBLICATIONS

A. V. Oppenheim et al., "Discrete Hilbert Transforms", *Digital Processing*, Chapter 7, pp. 337–375, Prentice-Hall, Inc., 1975.

*Primary Examiner*—Gary V. Harkcom
*Attorney, Agent, or Firm*—Hughes & Cassidy

[57] ABSTRACT

A serial cross-correlator having a pair of input ports (L and R). One of these ports (L) is connected to a first band-pass filter network (63) which is in turn connected to a digital Hilbert transformer (60). The other of the input ports (R) is connected to a second band-pass filter network (64) which is in turn connected to fixed delay (65). The output of the Hilbert transformer is connected to one input of a multiplier (66) while the output of the fixed delay is connected to the other input of the multiplier; and a low pass filter network (67) is connected to the output of the multiplier. The Hilbert transformer produces a 90° phase shift for input signals on line (61) from input port (L) relative to input signals on line (62) from input port (R) and the delay compensates for the delay in the Hilbert transformer so that signals reaching input port (L) are phase-shifted relative to the signals reaching input port (R) and the phase-shifted signals are multiplied with the other input signals to produce an output signal (DX) representative of the direction and magnitude of an arrival time difference between the two input signals.

4 Claims, 12 Drawing Figures

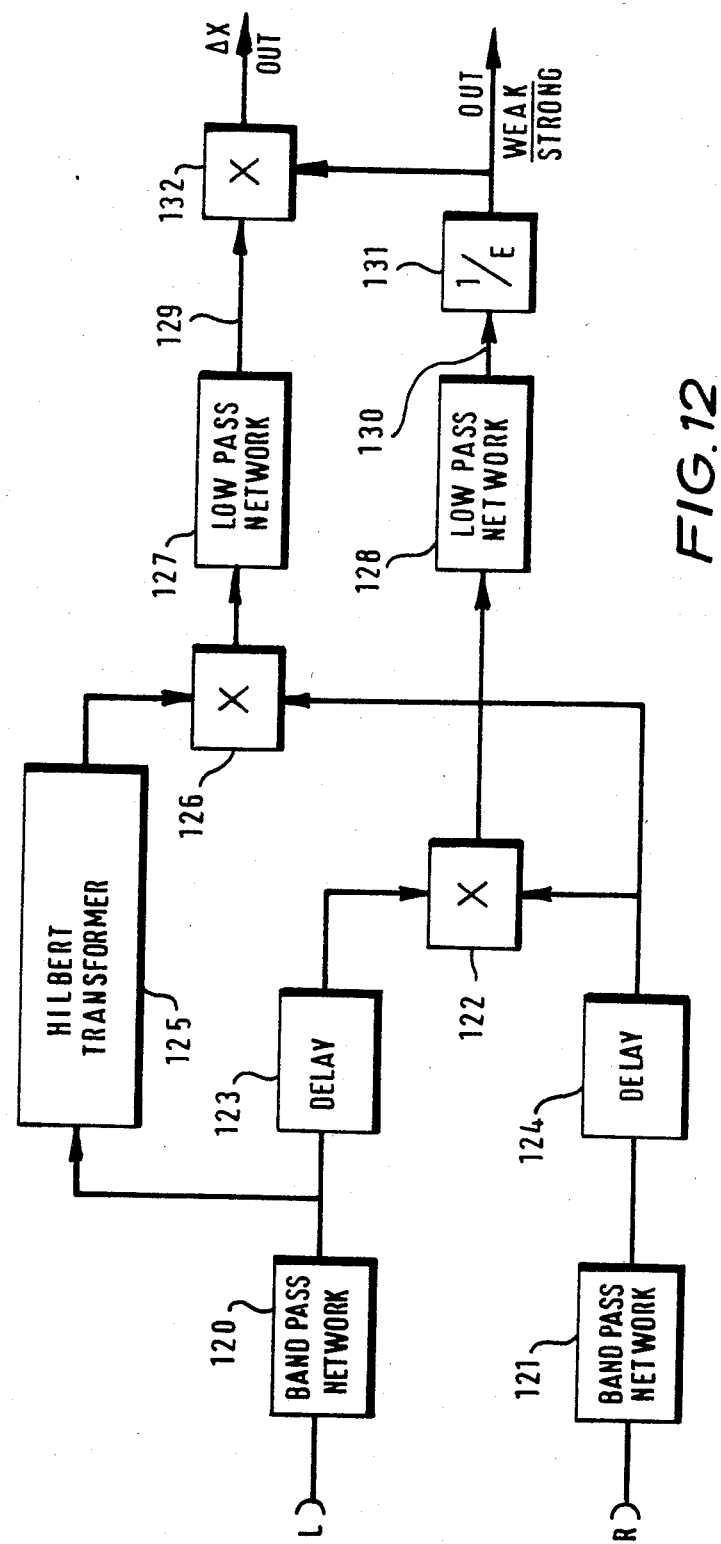

SERIAL CROSS-CORRELATORS

FIELD OF THE INVENTION

This invention relates to serial cross-correlators and especially to correlators having means to introduce a relative phase shift between two similar signals or data streams to enable signals representative of direction and/or magnitude of an arrival time difference in the two signals to be obtained. Such diameter and magnitude signals can be used as error-correction signals in control circuits. Typical signals would be those derived from the scanning of stereo images and a typical purpose would be to measure the distance of objects from photo-graphic or video cameras. Another application would be the matching of data streams derived from satellite scanning of terrain through different optical filters.

THE PRIOR ART

One known type of correlator is an orthogonal correlator and is shown in FIG. 1 to include a quadrature network set or pair 10 and 11 which introduce a 90° phase difference between input signals on lines 12 and 13 from input ports L and R respectively. The orthogonal correlator also has input band pass filter networks 14, 15 respectively in each line, a multiplier 16 connected to multiply the outputs of the quadrature pair 14, 15 and an output low pass filter network 17. The output of such an orthogonal correlator is shown in FIG. 2, with time difference between common events in the two signals $T_R - T_L$ $_I$ being shown on the abscissa and time magnitude Dx being shown on the ordinate for both a narrow band ratio (in broken line and a wide band ratio (in solid line).

As can be seen from the graph of FIG. 2, the sign and the magnitude of the curve represents the direction and magnitude of the arrival time difference over a limited range. Clearly the wide band ratio case (solid line) gives a less ambiguous signal than the narrow band ratio case.

FIG. 3 illustrates the simplest type of quadrature pair, the circuit is exact in the sense that all signal components wil be in quadrature (90°) at the outputs of the pair. The amplitude response of this lead/lag quadrature pair is such that they have a common attenuation of $-3$ dB at fo (fo$=\frac{1}{2}\pi RC$) but that the lead and lag network responses fall off symetrically above and below fo resulting in data loss to the extent that this lead/lag quadrature pair is not useful for input frequency ratios in excess of about 2:1.

FIG. 4 illustrates two lattice all pass networks that have a flat frequency response over a , theoretically, infinite frequency range. The range over which a 90° phase difference is achieved depends on the number of lattice sections employed and a frequency range of 1000 to 1 is practicable. The problem with such all pass quadrature circuits is in the time domain wherein output signals from the circuits, and from a correlator employing them, are extended in time and irregular in amplitude, rendering it very difficult to estimate the location and extent of the transient timing difference that caused it. Such a circuit is not suitable in a wide band corrective feedback or feed-forward system as both the useful band ratio and the transient distortion increase with the number of lattice sections employed.

The ideal quadrature network would have a flat amplitude response, would shift all signal components by 90° and would not introduce any variable common delay or phase shift into the two inputs. It is an object of the present invention to provide a serial cross-correlator having such an ideal quadrature network.

In its broadest aspect, the present invention lies in the realisation that a Hilbert transformer can be used to provide the required 90° phase shift, the impulsive response of which is shown by FIG. 5. Reference is made to Chapter 7 of "Digital Processing" by Alan V. Oppenheim and Ronald W. Schafer published in 1975 by Prentice-Hall, Inc. (ISBN 0-13-214635-5) and to U.S. Pat. No. 4,089,061 issued May 9, 1978, to A. T. Milewski for descriptions of a Hilbert Transformer's broad band quadrature phase shift.

SUMMARY OF THE INVENTION

According to the present invention, a serial cross-correlator has a pair of input ports, one of said ports being connected to the input of a digital Hilbert transformer, the other of said ports being connected to one input of a multiplier and the output of the Hilbert transformer is connected to another input of the multiplier whereby signals input to said one of said input ports can be phased-shifted relatively to signals input to said other of said input ports and said phase-shifted signals can be multiplied with the other input signals to produce an output signal representative of direction and magnitude of an arrival time difference in the two input signals.

One embodiment of the invention is a serial cross-correlator having a first band-pass filter network connected between said one port and said digital Hilbert transformer, a second band-pass filter network and a delay serially connected between said other port and said multiplier and a low pass filter network connected to the output of said multiplier, the delay being fixed to be equal to the delay of the Hilbert transformer.

Another embodiment of the invention is a serial cross-correlator having a pair of input ports, one of said input ports connected to a digital Hilbert transformer to a first delay, the other of said input ports being connected to a second delay, a first multiplier connected to the outputs of said Hilbert transformer and said second delay and a second multiplier connected to the outputs of said first delay and said second delay and divider means connected to the outputs of the first and second multipliers, the delays produced by said first and second delays both being fixed to be equal to the delay of said Hilbert transformer; whereby the level and slope of the orthogonal correlator output from said first multiplier and the level of the correlator output from said second multiplier are all proportional to the levels of said input signals and the output signal from the divider means is rendered independent of input level but retains the slope of the orthogonal correlator signals. A band pass filter network can be connected to each input port and a low pass filter network to the output of each multiplier.

The above and other features of the present invention are illustrated, by way of example, in the drawings.

BRIEF DESCRIPTION OF THE DRAWING FIGURES ILLUSTRATING THE INVENTION

FIG. 12 is a block diagram of an alternative serial cross-correlator in accordance with the invention.

DETAILED DESCRIPTION OF PREFERRED EMBODIMENTS

Figure 6:
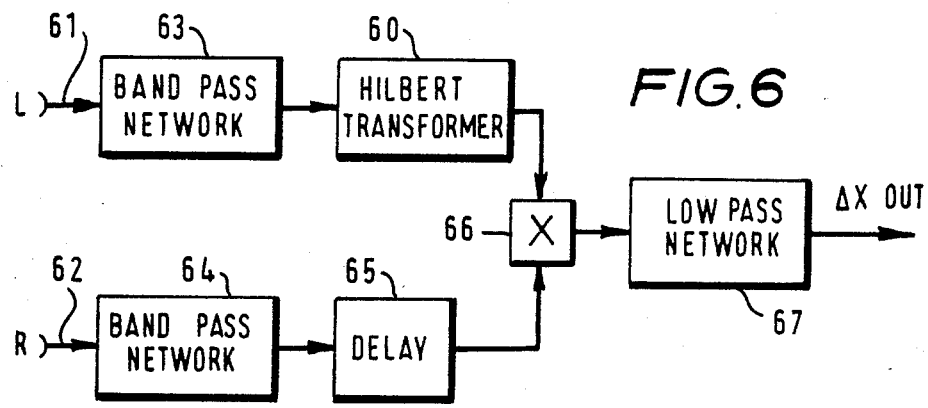
FIG. 6 is a block diagram of a serial cross-correlator in accordance with the invention.

Referring now to the drawings, FIG. 6 shows a Hilbert orthogonal correlator to consist of a digital Hilbert transformer 60 that produces a 90° phase shift for input signals on line 61 from input port L relative to input signals on line 62 from input port R. The correlator also has an input band pass filter network 63 and 64 in lines 61 and 62 respectively. A fixed delay 65 is connected in line 62 to compensate for the delay of the Hilbert transformer 60. The output of the Hilbert transformer 60 and the delay 65 are connected to a multiplier 66 to the output of which is connected a low pass filter network 67. The relationship between the band pass filter networks 63 and 64 and the low pass filter network 67 is that the input filters restrict input signals to frequencies between $f_1$ Hertz and $f_2$ Hertz and the low pass filter restricts the output signal to frequencies less than $2f_1$ Hertz.

Figure 7:
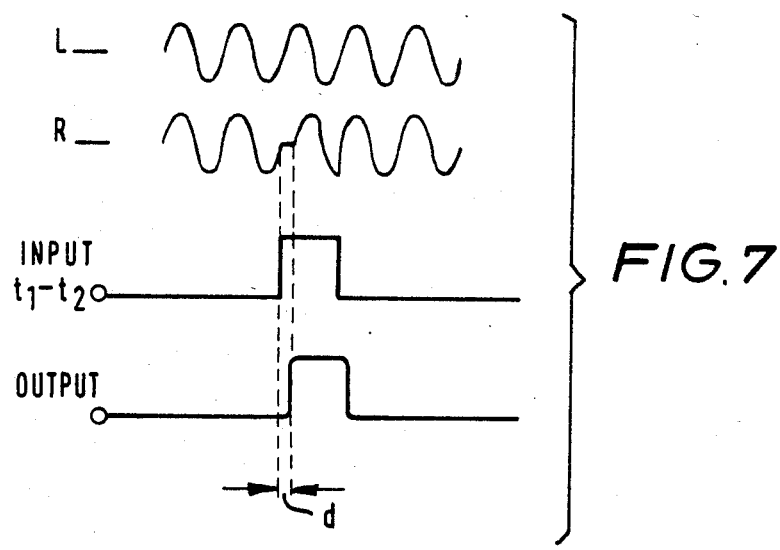
FIG. 7 is a graph showing the inputs and output of the correlator of FIG. 6.

FIG. 7 is a graph showing the transient response of the Hilbert correlator of FIG. 6 to an impulsive change in time difference $(t_1 - t_2)$ of the input signals L and R; the rounding and delay (d) in the output being caused by the low pass filter network 67.

FIGS. 8 and 9 and FIGS. 10 and 11 respectively show, in block diagram form and by graph, two alternative digital Hilbert transformer circuits.

Figure 8:
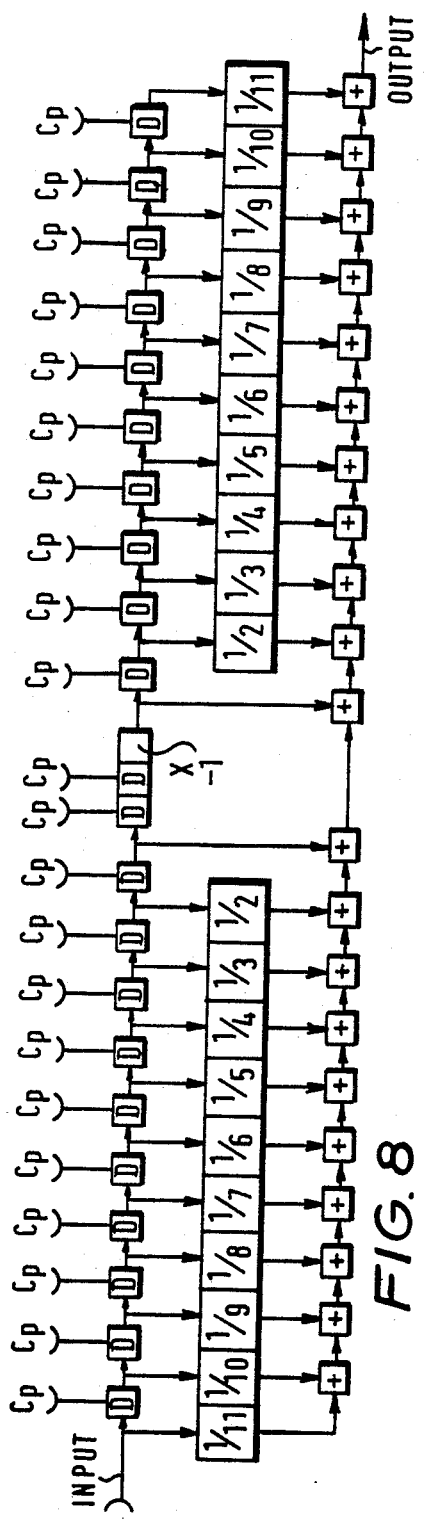
FIG. 8 is a circuit diagram of one digital Hilbert transformer.
Figure 9:
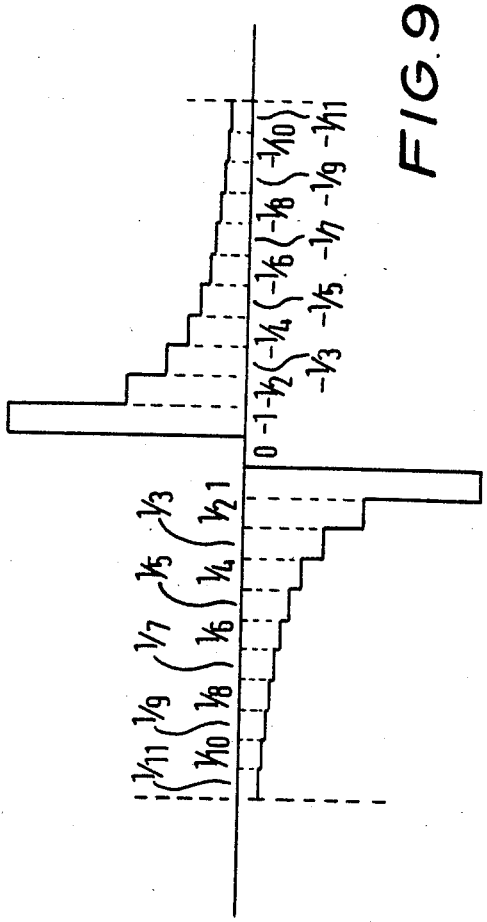
FIG. 9 is a graph showing the output of the Hilbert transformer of FIG. 8.

As can be seen in FIG. 8, a clocked series of delay registers (D) have their outputs multiplied by a series of multipliers, each muliplying by a differing factor e.g. 1/11th, 1/10th, 1/9th . . . ¼th, ⅓rd, ½. The muliplier outputs feed to a series of adders. There is an inverter half-way along the series of delay registers and a second series of multipliers, again each multiplying by a differing factor e.g. ½, ⅓rd, ¼th . . . 1/9th, 1/10th, 1/11th, with the multiplier outputs feeding to the adder series. The output of this Hilbert transformer circuit is shown by the graph of FIG. 9.

Figure 10:
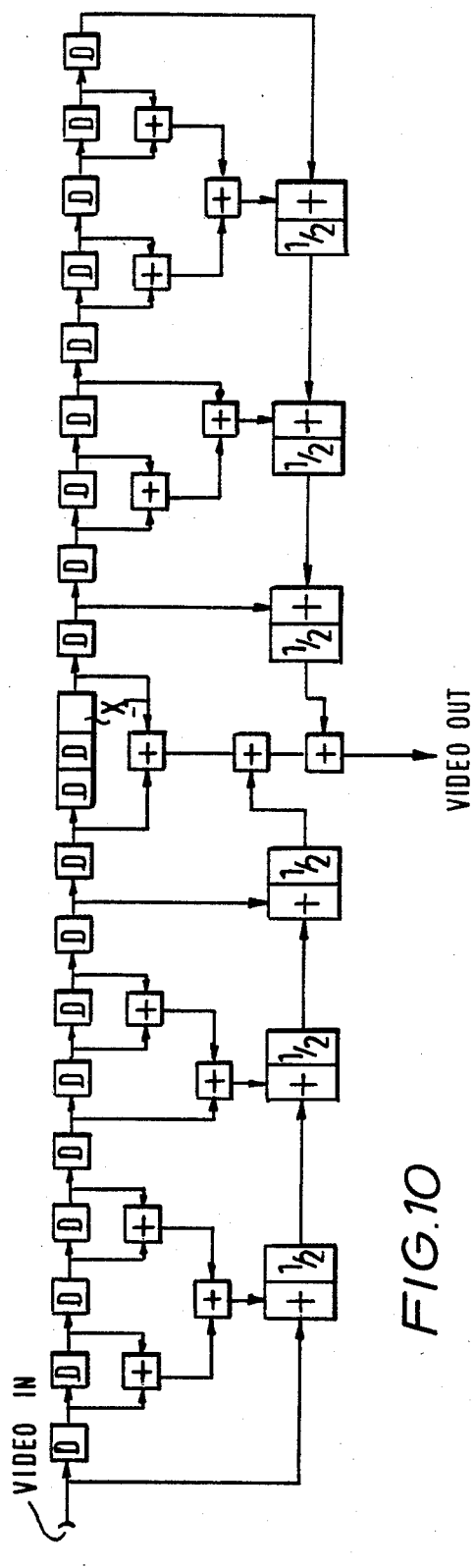
FIG. 10 is a circuit diagram of a simplified digital Hilbert transformer.

A simplified digital Hilbert transformer circuit is shown by FIG. 10 to have a series of clocked delay registers D but, in this circuit, their outputs are arranged in groups of 5,3,1, 1; an inverter, 1,1,3 and 5 by means of an array of adders + connected to the delay register outputs, and thence to an alternating series of adders and half-multipliers.

Figure 11:
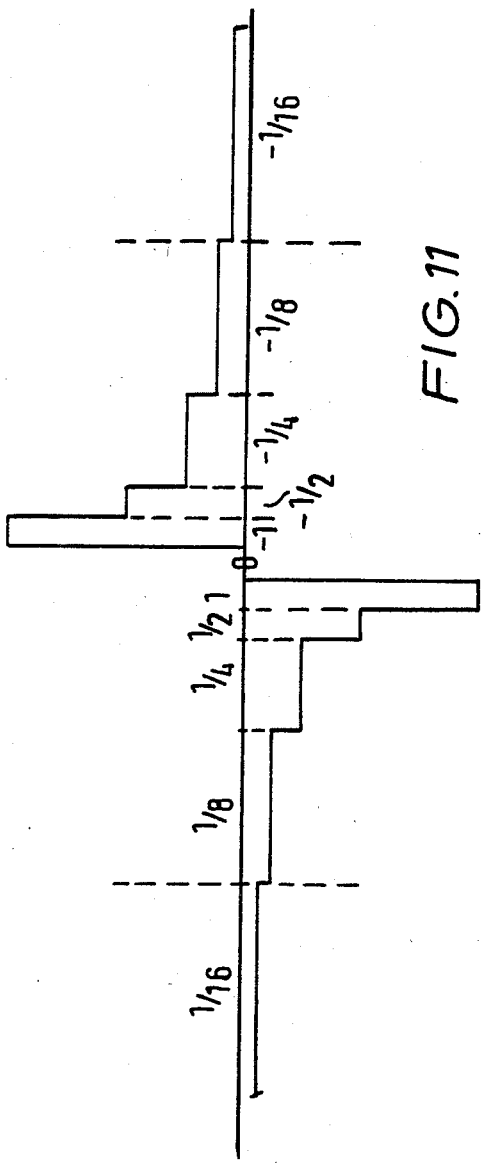
FIG. 11 is a graph showing the output of the Hilbert transformer of FIG. 10.

The output of the Hilbert transformer is shown by the graph of FIG. 11 to be an approximation formed by, from centre zero, a reducing series of 1/1, ½, ¼, ¼, ¼, ⅛, ⅛, ⅛, ⅛, ⅛.

In all the orthogonal correlators so far described, the magnitude of the output signal is a factor of both the input time difference and the amplitude of the input signals. Such amplitude dependency limits the dynamic range of useful operation and tends to obscure the magnitude of the time difference. The Hilbert orthogonal correlator shown in FIG. 12 has additional elements that permit the cancellation of the effect of input level on the magnitude of the output signals.

Figure 1:
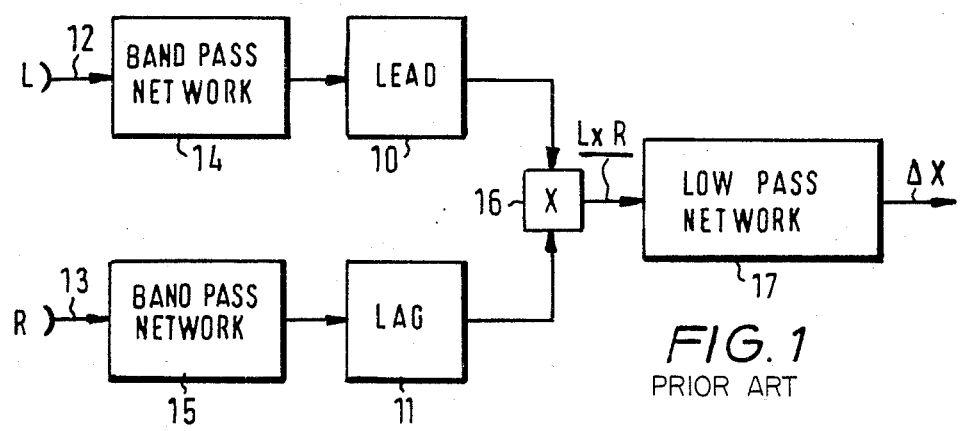
FIGS. 1-5 are illustrations of the prior art.
Figure 2:
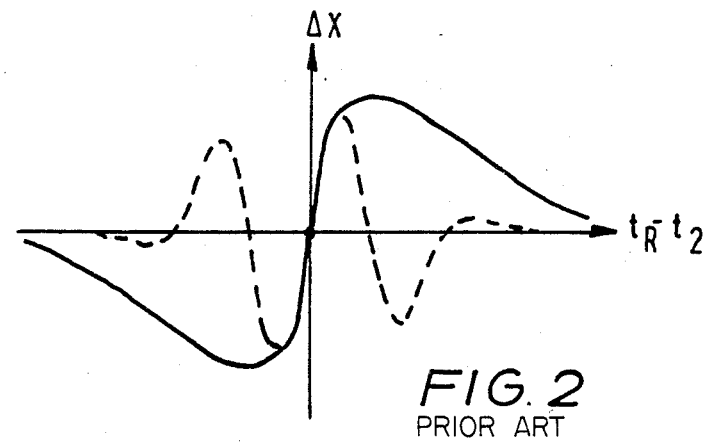
Figure 3:
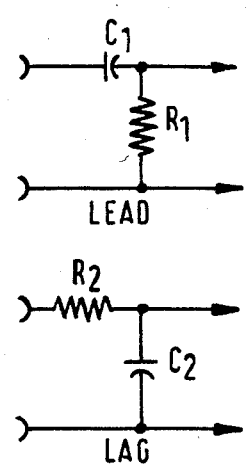
Figure 4:
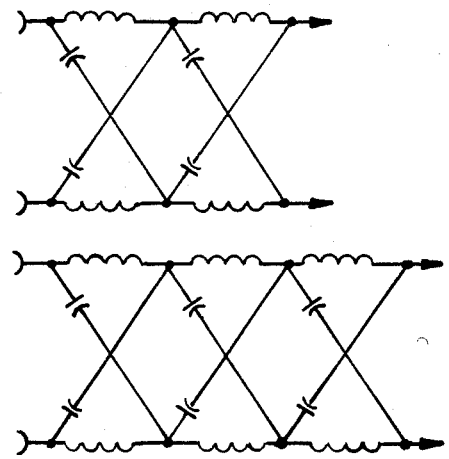
Figure 5:
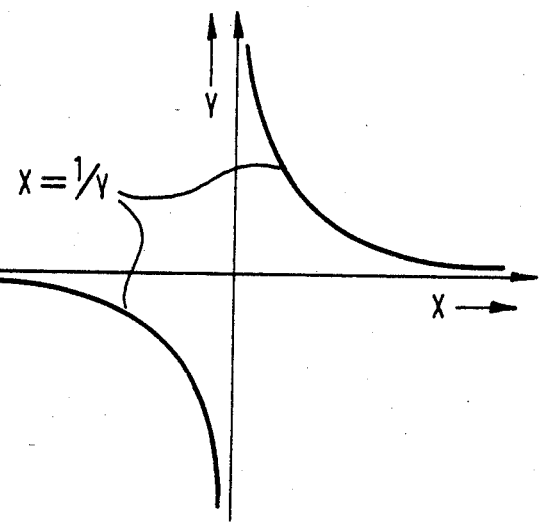

The correlator of FIG. 12 is generally of the type shown in FIG. 1 or FIG. 6 in that a pair of input ports L and R are respectively each connected to a band pass filter network 120, 121. The outputs of the two filter networks are each connected to a muliplier 122 via a fixed delay 123, 124. A Hilbert transformer 125 is also connected to the output of filter 120 and thence to a second multiplier 126. The output of delay 121 is also connected to the second multiplier 126. A low pass filter network 127, 128 is respectively connected to the outputs of multipliers 126 and 122 which respectively output on lines 129 and 130. As the delay in delays 123 and 124 are fixed to equal the average mean delay in the Hilbert transformer 125, the correlator output signal on line 130 will be coincident with the orthogonal correlator output on line 129. As the level of the correlator output on line 130 and the level and slope of the orthogonal correlator output on line 129 are all proportional to the product of the input levels L and R, the division of signal 129 by signal 130 yields an ouput signal independent of input level but retaining the slope of the signals on line 129. The inverter 131 and the mulitplier 132 provide such division.

What is claimed and desired to be secured by Letters of the United States is:

1. A serial cross-correlator having:
   (i) first and second input ports;
   (ii) a digital Hilbert transformer, said transformer having an input which is connected to said first input port;
   (iii) first delay means, said first delay means having an input which is connected to said first input port in parallel with said Hilbert transformer;
   (iv) second delay means, said second delay means having an input which is connected to said second input port;
   (v) first mulitplier means, said first multiplier means having inputs which are respectively connected to the output of said Hilbert transformer and to the output of said second delay means;
   (vi) second multiplier means, said second multiplier means having inputs which are respectively connected to the output of said first delay means and to the output of said second delay means; and
   (vii) divider means, said divider means having a dividend input which is connected to the output of said first multiplier means and a divisor input which is connected to the output of said second multiplier means;
   (viii) whereby the delays produced by said first and second delay means are each made equal to the average mean delay in said Hilbert transformer and whereby: (1) the output from the first multiplier means is an orthogonal correlator output signal having both level and slope, (2) the output from the second multiplier means is a correlator output signal having level only, and, (3) the levels of the orthogonal correlator signal and the correlator signal are both proportional to the levels of the signals transmitted to the first and second input ports and the divided output signal from the divider means is independent of input signal level but retains the slope of the orthogonal correlator signal.

2. A serial cross-correlator as defined in claim 1, wherein said divider means comprises:

(i) inverter means, said inverter means having an input which is connected to the output of said second multiplier means; and (ii) third multiplier means, said third multiplier means having inputs which are respectively connected to the output of said first multiplier means and to the output of said inverter means.

3. A serial cross-correlator as defined in claim 2, which also comprises:

(i) first low-pass filter means connected between the output of said first multiplier means and that input to said third multiplier means to which the output of the first multiplier means is connected; and (ii) second low-pass filter means connected between the output of said second multiplier means and the input to said inverter means.

4. A serial cross-correlator as defined in claim 3, which also comprises:

(i) first band-pass filter means connected between said first input port and the parallel inputs to said Hilbert transformer and said first delay means; and (ii) second band-pass filter means connected between said second input port and the input to said second delay means.

* * * * *

UNITED STATES PATENT AND TRADEMARK OFFICE
CERTIFICATE OF CORRECTION

PATENT NO. : 4,586,153
DATED : April 29, 1986
INVENTOR(S) : GILBERT L. HOBROUGH

It is certified that error appears in the above-identified patent and that said Letters Patent are hereby corrected as shown below:

Column 1, line 34, after "line" insert a --close parenthesis [")"]--.

Column 1, line 43, change "wil" to --will--.

Column 3, line 40, change "muliplying" to --multiplying--.

Column 3, line 41, change "muliplier" to --multiplier--.

Column 4, line 5, change "muliplier" to --multiplier--.

Column 4, line 23, change "mulitplier" to --multiplier--.

Column 4, line 38, change "mulitplier" to --multiplier--.

Signed and Sealed this

Seventeenth Day of March, 1987

Attest:

DONALD J. QUIGG

*Attesting Officer*  *Commissioner of Patents and Trademarks*